Jan. 7, 1936. W. A. OUBRIDGE 2,027,116

RING HOLDING APPARATUS

Filed March 5, 1934

Inventor:
William A. Oubridge
by Richard E. Babcock
Attorney

Patented Jan. 7, 1936

2,027,116

UNITED STATES PATENT OFFICE 2,027,116

RING HOLDING APPARATUS

William Arthur Oubridge, Coventry, England

Application March 5, 1934, Serial No. 714,186
In Great Britain October 27, 1933

6 Claims. (Cl. 266—2)

With the object of producing a piston ring which when in use will exert a uniform outward radial pressure upon the cylinder wall, it has been proposed to expand the split circular ring by the application of uniform radial pressures thereto and to expose the ring to the action of heat to set the material of the ring in its expanded form. It has also been proposed to mount a plurality of such rings in stack formation upon a common expanding device and to heat the stack of expanded rings with a weight on top of the stack so as to keep the rings in plane alignment without restraining their freedom of radial expansion or contraction.

Where piston or similar rings are required to be heated to a temperature at which they are in a more or less plastic state, as for example, where the rings are heat treated for hardening purposes, it is necessary, to avoid damage to or distortion of the rings whilst permitting them to freely expand and contract in a radial direction. For this purpose it has been proposed to clamp them in co-axial series between a pair of plates by means of an axially arranged bolt. This method suffers from the defect that the plates buckle and/or the bolt becomes permanently elongated under the expansion of the heated rings so that the clamping pressure becomes relaxed and in consequence the rings, being no longer firmly clamped, are liable to damage or distortion in removing them from the furnace or heating bath and in the subsequent quenching operation.

According to this invention piston rings whether made to the selected curve, as defined in my prior British Patent No. 135,249, by the method therein described, or by hammering or casting or by form-turning to the shape of the selected curve or by any other method of manufacture, are subjected to an axially applied pressure which is adjustable either at will or automatically at any stage of the hardening or heat-forming process. The degree of pressure will be such as to prohibit distortion of the rings out of their own plane and to prevent relative movement between them and the clamping means throughout the said process, or the pressure can be such that they are free to expand or contract in a radial direction.

The improved clamping means employed is characterized in that the pressure exerted thereby on the rings can be adjusted from the outside of the furnace or heating bath in which the rings are undergoing heat treatment.

In the accompanying drawing.

Figure 1:
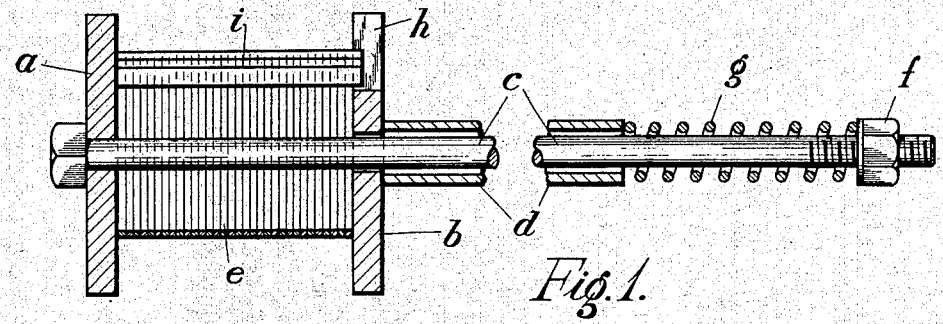
Figure 1 is a longitudinal sectional view of a form of clamping device for use in carrying out the present invention.
Figure 2:
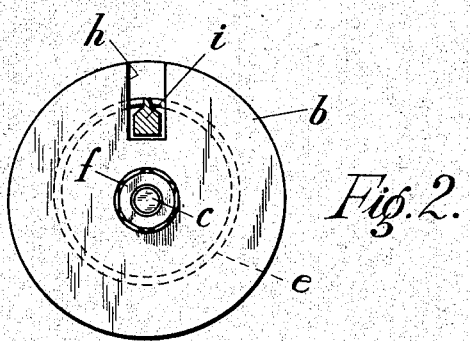
Figure 2 is an end view of the same.

As shown in Figures 1 and 2, the improved clamping device may comprise a pair of co-axially arranged plates $a$, $b$ the former of which has a central spindle $c$ projecting through a co-axial tubular member $d$ on the plate $b$. The said spindle and tubular member may be of such length as to protrude from the furnace or heating bath (not shown) a distance sufficient to enable them to be safely handled. The rings $e$ are arranged, as shown, between the plates $a$ and $b$ and are subjected thereby to an axially applied pressure by means of a nut $f$ on the screw-threaded end of the spindle $c$ taking a bearing against the end of the tubular member $d$.

A preferably helical compression spring $g$ is provided so as to allow, or compensate, for axial expansion or contraction of the rings without materially altering the pressure. To safeguard this spring from being destroyed or injured by the heat of the furnace or heat bath, said spring $g$ will be located near the free end of the central spindle $c$ at such distance from the furnace or heat bath as to be outside of, or beyond, the active heat zone thereof at such point as not to be injuriously affected by the heat. Said spindle $c$ is a long handling spindle which protrudes from the furnace or heat bath for such distance that its outer end portion is located beyond the active heat zone of said furnace or bath at such point as not to be materially affected by the heat and so that it may be safely grasped and handled with the bare hand, and consequently the location of the spring $g$ at this outer end portion will so locate it as to be remote from the heat zone so as not to be adversely affected thereby. Preferably the spring $g$ will be disposed about the outer or free end portion of the spindle $c$ and interposed between the outer face of the tubular member $d$ and the inner face of the nut $f$ or a washer slidable on the spindle $c$ and bearing against the nut $f$, and said spring $g$ presses, or is adapted to press, in opposite directions against the outer end of a tubular member $d$ and the inner face of the said washer or the nut $f$ to exert a pressure acting through the spindle $c$ and the tubular member $d$ in opposite directions and tending to force the plates $a$ and $b$ toward each other to clamp between them the intervening co-axial series of rings $e$.

As will be readily understood, the pressure of the spring $g$, and the force exerted thereby, can be quickly and easily adjusted, either before starting the heat treatment of the series of co-axial rings, or after the heat treatment thereof has been started and while the same remain in the furnace or heat bath, by simply turning the nut $f$ relatively to the spindle $c$ in the proper direction according as it may be desired to increase or decrease the pressure.

Instead of screw-threading the end of the spindle to receive a nut it can be slotted to receive a taper cottar which will abut against the end of the tube and can be driven further home to take up any slackness that may develop in the clamping device as the result of axial contraction or expansion of the rings. Where the rings are being heat-formed to the selected curve aforesaid the plate $b$ may be formed with an open ended radial slot $h$ to accommodate the introduction between the split ends of the rings of a gap-spacing strip $i$.

Figure 3:
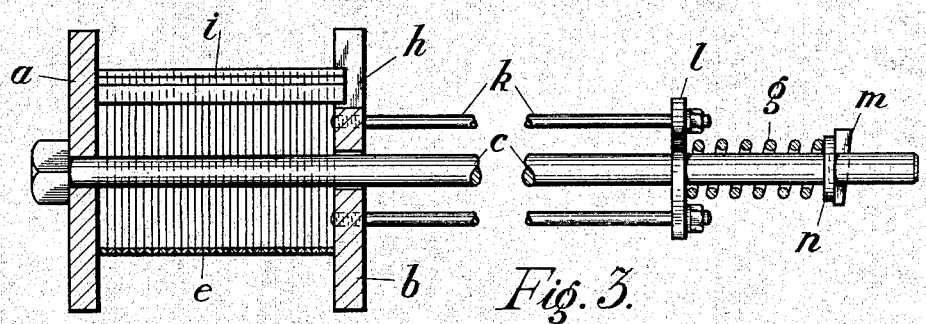
Figures 3 and 4 are similar views respectively of a modified construction.
Figure 4:
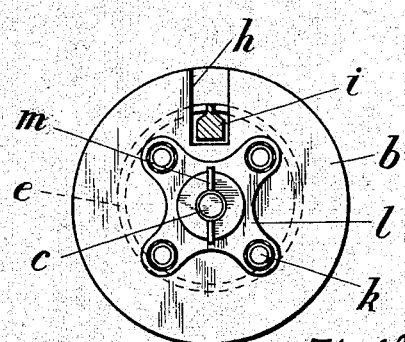

In the alternative construction of clamping device shown in Figures 3 and 4, the plate $b$ may be fitted with a plurality of bars $k$ parallel with the central spindle $c$ attached to the plate $a$, the free ends of said bars being connected to or abutting against a cross-head $l$ sliding on the outer end of the said spindle and subject to the action of a nut or, as shown, of a cottar $m$ at the free end of the latter bearing either directly against the cross-head or indirectly through the medium of loose collar $n$ and a compression spring $g$.

By means of this invention risk of distortion of and damage to the rings at all stages of the hardening or heat-forming process is eliminated, and in such a manner that the rings are at all times free to expand and contract in a radial direction.

I claim:—

1. Apparatus for keeping metal rings in plane alignment whilst undergoing heat treatment including any subsequent quenching and handling, said apparatus comprising a pair of co-axially arranged clamping plates having opposed faces adapted to receive between them the rings in co-axial series, means for maintaining said rings in co-axial relationship and means for connecting said plates to hold them in operative clamping relationship, said means including an interposed yielding pressure exerting means to compensate for expansion and contraction in an axial direction incident to such treatment.

2. Apparatus for keeping metal rings in plane alignment while undergoing heat treatment and comprising a pair of co-axially arranged clamping plates adapted to receive the rings in co-axial series therebetween, in combination with means for clamping the respective plates against the end faces of the respective end rings of said co-axial series of rings, said means comprising a relatively long element extending outside of the heat treating apparatus and beyond the active heat zone thereof, a part associated with said element, a spring associated with said element and part beyond said active heat zone and adapted to exert pressure tending to force said clamping plates toward each other, and means for varying the degree of pressure exerted by said spring during the course of a heat treatment to modify the pressure exerted thereby on said plates and said intervening series of rings while the latter are undergoing heat treatment.

3. Apparatus for keeping metal rings in plane alignment while undergoing heat treatment and comprising a pair of co-axially arranged clamping plates adapted to receive the rings in co-axial series between them, in combination with means for clamping the respective plates against the end faces of the respective end rings of said co-axial series of rings, said means comprising a relatively long element extending outside of the heat treating apparatus and beyond the active heat zone thereof, a part associated with said element, and a spring cooperating with said element and part at a point beyond said active heat zone and adapted to exert pressure tending to force said clamping plates toward each other.

4. Apparatus for keeping metal rings in plane alignment while undergoing heat treatment and comprising a pair of co-axially arranged clamping plates adapted to receive the rings in co-axial series between them, in combination with means for clamping the respective plates against the respective end rings of said co-axial series of rings, said means comprising a long spindle connected to one of said plates and freely slidably extending through the other plate and being of such length as to extend outside of the heat treating apparatus and beyond the active heat zone thereof, an element adapted to exert with its inner end portion a thrust against said other plate and having its outer end portion located beyond said active heat zone and closely adjacent to said spindle, and resilient means located beyond said active heat zone and acting to force said spindle and said element in opposite directions to force said plates toward each other.

5. Apparatus for keeping metal rings in plane alignment while undergoing heat treatment and comprising a pair of co-axially arranged clamping plates adapted to receive the rings in co-axial series between them, in combination with means for clamping the respective plates against the respective end rings of said co-axial series of rings, said means comprising a long spindle connected to one of said plates and freely slidably extending through the other plate and being of such length as to extend outside of the heat treating apparatus and beyond the active heat zone thereof, a tubular member disposed about said spindle and adapted to engage with its inner end the outer face of said other plate, said tubular member extending lengthwise of said spindle to such point as to have its outer end located beyond said active heat zone, and a spring located beyond said active heat zone and exerting force tending to force said spindle and said tubular member in opposite directions.

6. Apparatus for keeping metal rings in plane alignment while undergoing heat treatment and comprising a pair of co-axially arranged clamping plates adapted to receive the rings in co-axial series between them, in combination with means for clamping the respective plates against the respective end rings of said co-axial series of rings, said means comprising a long spindle connected to one of said plates and freely slidably extending through the other plate and being of such length as to extend outside of the heat treating apparatus and beyond the active heat zone thereof, a tubular member disposed about said spindle and adapted to engage with its inner end the outer face of said other plate, said tubular member extending lengthwise of said spindle to such point as to have its outer end located beyond said active heat zone, a helical spring disposed about the outer end portion of said spindle with its inner end in engagement with the opposed outer end of said tubular member and normally under compression, and means engaging said spindle and forming an abutment for the outer end of said spring and adjustable axially of said spindle to vary the degree of compression of said spring.

WILLIAM ARTHUR OUBRIDGE.